(12) United States Patent
Baird et al.

(10) Patent No.: US 7,799,707 B2
(45) Date of Patent: Sep. 21, 2010

(54) METHOD OF FORMING GATED, SELF-ALIGNED MICRO-STRUCTURES AND NANO STRUCTURES

(75) Inventors: Ronald J. Baird, Grosse Ile, MI (US); Daniel G. Georgiev, Canton, MI (US); Ivan Avrutsky, Troy, MI (US); Golam Newaz, Ann Arbor, MI (US); Gregory W. Auner, Livonia, MI (US)

(73) Assignee: Wayne State University, Detroit, MI (US)

( * ) Notice: Subject to any disclaimer, the term of this patent is extended or adjusted under 35 U.S.C. 154(b) by 176 days.

(21) Appl. No.: 12/184,739

(22) Filed: Aug. 1, 2008

(65) Prior Publication Data

US 2009/0142936 A1 Jun. 4, 2009

Related U.S. Application Data

(63) Continuation of application No. PCT/US2007/003256, filed on Feb. 5, 2007.

(60) Provisional application No. 60/765,634, filed on Feb. 6, 2006.

(51) Int. Cl.
 *H01L 21/324* (2006.01)
 *H01L 21/42* (2006.01)
 *H01L 21/00* (2006.01)
 *H01L 21/268* (2006.01)
(52) U.S. Cl. .......... 438/795; 438/20; 257/E21.347
(58) Field of Classification Search .......... 438/795, 438/20; 257/E21.347
See application file for complete search history.

(56) References Cited

U.S. PATENT DOCUMENTS 6,057,172 A * 5/2000 Tomihari ............ 438/20
2002/0125805 A1 9/2002 Hsu

OTHER PUBLICATIONS

D.G. Georgiev, et al., entitled "X-ray photoelectron spectroscopy study of excimer laser treated alumina films," Appl. Phys. Lett. 72 (1), Jan. 5, 1998, pp. 31-33.
C.A. Spindt, et al., entitled "Physical properties of thin-film field emission cathodes with molybdenum cones," Journal of Applied Physics, vol. 47, No. 12, Dec. 1976, pp. 5248-5263.

(Continued)

*Primary Examiner*—Luan C Thai
(74) *Attorney, Agent, or Firm*—Brinks Hofer Gilson & Lione

(57) ABSTRACT

Methods of forming a gated, self-aligned nano-structures for electron extraction are disclosed. One method of forming the nano-structure comprises irradiating a first surface of a thermally conductive laminate to melt an area across the first surface of the laminate. The laminate comprises a thermally conductive film and a patterned layer disposed on the first surface of the film. The patterned layer has a pattern formed therethrough, defining the area for melting. The film is insulated at a second surface thereof to provide two-dimensional heat transfer laterally in plane of the film. The liquid density of the film is greater than the solid density thereof. The method further comprises cooling the area inwardly from the periphery thereof to form the nano-structure having an apical nano-tip for electron emission centered in an electrically isolated aperture that serves as a gate electrode to control electron extraction in a gated field emitter device.

27 Claims, 4 Drawing Sheets

OTHER PUBLICATIONS

L. Dvorson, et al., entitled "Double-gated silicon field emitters," J. Vac. Sci. Technol. B 21(1), Jan./Feb. 2003, pp. 486-494.

Heinz H. Busta, entitled "Vacuum microelectronics," J. Micromech. Microeng. 2 (1992), pp. 43-74.

S. Tuner, et al., entitled "Cell attachment on silicon nanostructures," J. Vac. Sci. Technol. B 15(6), Nov./Dec. 1997, pp. 2848-2854.

A.M.P. Tuner, et al., entitled "Attachment of astroglial cells to microfabricated pillar arrays of different geometries," J. Biomed Mater Res., 51, 2000, pp. 430-441.

Michael P. Maher, et al., entitled "The neurochip: a new multielectrode device for stimulating and recording from cultured neurons," Journal of Neuroscience Methods 87 (1999), pp. 45-56.

Tsing-Hua Her, et al., entitled "Microstructuring of silicon with femtosecond laser pulses," Applied Physics Letters, vol. 73, No. 12, Sep. 21, 1998, pp. 1673-1675.

A.J. Pedraza, et al., entitled "Silicon microcolumn arrays grown by nanosecond pulsed-excimer laser irradiation," Applied Physics Letters, vol. 74, No. 16, Apr. 19, 1999, pp. 2322-2324.

F.Sánchez, et al., entitled "Dynamics of the hydrodynamical growth of columns on silicon exposed to ArF excimer-laser irradiation," Appl. Phys. A 66 (1998), pp. 83-86.

F.Sánchez, et al., entitled "Whiskerlike structure growth on silicon exposed to ArF excimer laser irradiation," Appl. Phys. Lett. 69 (5), Jul. 29, 1996, pp. 620-622.

S.I. Dolgaev, et al., entitled "Formation of conical microstructures upon laser evaporation of solids," Appl. Phys. A 73 (2001), pp. 177-181.

A.J. Pedraza, et al., entitled "Surface nanostructuring of silicon," Appl. Phys. A 77 (2003), pp. 277-284.

Ivan Avrutsky, et al., entitled "Super-resolution in laser annealing and ablation," Applied Physics Letters, vol. 84, No. 13, Mar. 29, 2004, pp. 2391-2393.

S. De Unamuno, et al., entitled "A Thermal Description of the Melting of c- and a-Silicon Under Pulsed Excimer Lasers," Applied Surface Science 36 (1989), pp. 1-11.

A.M. Prokhorov, et al., entitled "Laser-induced Surface Gratings," Nonlinear Surface Electromagnetic Phenomena, Edited by H.E. Ponath, et al., Elsevier Science Publishers B.V., 1991), pp. 525-560.

Dieter Bäuerle, entitled "Laser Processing and Chemistry," Third, Revised and Enlarged Edition With 314 Figures and 13 Tables, Chapter 10, entitled "Surface Melting," pp. 165-182; Chapter 11, entitled "Vaporization, Plasma Formation," pp. 187-219; Chapter 12, entitled "Nanosecond-Laser Ablation," pp. 221-257; Chapter 28, entitled "Instabilities and Structure Formation," pp. 571-616, Sep. 9, 1995.

Teiichirou Chiba, et al. entitled "Formation of Micropeak Array on a Silicon Wafer," The Japan Society of Applied Physics, Aug. 2000, vol. 39, Part 1, No. 8, pp. 4803-4810.

Georgiev et al., "A Systematic Study of the Formation of Nano-Tips on Silicon Thin Films by Excimer Laser Irradiation", Materials Research Society Symposia Proceedings, Spring 2005, vol. 872, pp. J13.6.1-J136.6; especially: abstract; pp. J13.6.2, J13.6.4, J136.5; Figs. 1,4.

Georgiev et al., "Controllable excimer-laser fabrication of conical nano-tips on silicon thin films", Applied Physics Letters, Jun. 2004, vol. 84, No. 24, pp. 4881-4883; entire article, especially Fig. 1.

* cited by examiner

METHOD OF FORMING GATED, SELF-ALIGNED MICRO-STRUCTURES AND NANO STRUCTURES

CROSS-REFERENCE TO RELATED APPLICATIONS

This application is a continuation of International Application No. PCT/US2007/003256 filed on Feb. 5, 2007, entitled "METHOD OF FORMING GATED, SELF-ALIGNED MICRO-STRUCTURES AND NANO-STRUCTURES" and claims the benefit of U.S. Provisional Application Ser. No. 60/765,634 filed on Feb. 6, 2006, entitled "METHOD OF FORMING GATED, SELF-ALIGNED MICRO-STRUCTURES AND NANO-STRUCTURES," the entire contents of each are incorporated herein by reference.

FIELD OF THE INVENTION

The present invention relates to systems and methods of forming gated, self-aligned micro-structures and nano-structures having nano-tips that may be used for electron field emission and other applications.

BACKGROUND OF THE INVENTION

High-intensity pulsed laser radiation is used to modify surfaces of materials and fabricate technologically desirable structures on a micrometer and sub-micrometer level. Besides their technological importance, such surface modifications are currently of substantial scientific interest. Although adequate, current processes used for such irradiation surface modifications are relatively complex, involve several steps, and are non-equilibrium due to high heating and cooling rates. Also, there are large temperature gradients, and a variety of thermal, chemical and photochemical transformations that can occur. Such processes and their interplay are often not fully understood, providing a need for systematic studies of laser irradiation of materials as a function of irradiation parameters.

Thus, improved, reliable, simple and low-cost techniques for fabrication of micro-structures and nano-structures having nano-tips of silicon and other semiconductor and metal materials are needed. Moreover, relatively large, high-density arrays of such nano-tips, are desirable in a number of electron field emission applications.

BRIEF SUMMARY OF THE INVENTION

The present invention generally provides a methods of forming laterally thermally conductive laminates and using these laminates to make gated, self-aligned micro-structures and nano-structures having nano-tips that can be used in field emission and other applications. Embodiments of the present invention provide improved and efficient ways of fabricating such gated, self-aligned nano-structures for electron field emission and other applications.

In one example, the present invention provides a method of forming a self-aligned nano-structure. The method comprises irradiating a first surface of a thermally conductive laminate to melt an area across the first surface of the laminate. The laminate comprises a thermally conductive film and a patterned layer disposed on the first surface of the film. The patterned layer has a pattern formed therethrough defining the area for melting. The film is insulated at a second surface thereof to provide two-dimensional heat transfer across the film. The liquid density of the film is greater than the solid density thereof. The method further comprises cooling the area inwardly from the periphery thereof to form the nano-structure having an apical nano-tip.

In another example, the present invention provides a thermally conductive laminate for forming a gated, self-aligned nano-structure for electron extraction. The laminate comprises a thermally conductive film having a first surface and a second surface. The first surface has an area for irradiating to melt the area. The laminate further comprises a patterned layer disposed on the first surface of the film. The patterned layer has a pattern formed therethrough, defining the area on which to irradiate for melting. The liquid density of the film is greater than the solid density thereof. The thermally conductive laminate further comprises an insulating substrate disposed on the second surface of the thermally conductive film for insulating the film to provide two-dimensional heat transfer across the film when irradiated.

In yet another example, the present invention provides a method making a thermally conductive laminate for forming a gated, self-aligned micro-structure or nano-structure. The method comprises providing a starting material comprising a thermally conductive film having a first surface and a second surface. The starting material further comprises an insulating substrate disposed on the second surface. The method further comprises disposing a cover layer on the first surface of the thermally conductive film. The cover layer comprises a reflective material. The method further comprises forming a pattern through the cover layer to define a patterned layer having a periphery on the thermally conductive film. This defines an area on which irradiation occurs when a laser pulse is directed thereon.

In yet another example, the present invention provides a thermally conductive laminate for forming a gated, self-aligned nano-structure for electron extraction. The laminate comprises a thermally conductive film having a first surface and a second surface. The first surface has an area for irradiating to melt the area. The laminate further comprises a patterned bi-layer disposed on the first surface of the film. The patterned bi-layer has a conductive top layer and an insulating interlayer into which a pattern is formed therethrough defining the area on which to irradiate for melting. The liquid density of the film is greater than the solid density thereof. The top conducting layer forms the gate electrode in a gated field emitter structure. The laminate further comprises an insulating substrate disposed on the second surface of the thermally conductive film for insulating the film to provide two-dimensional heat transfer laterally in the film when irradiated.

Further aspects, features, and advantages of the invention will become apparent from consideration of the following description and the appended claims when taken in connection with the accompanying drawings.

DETAILED DESCRIPTION OF THE INVENTION

Figure 1:
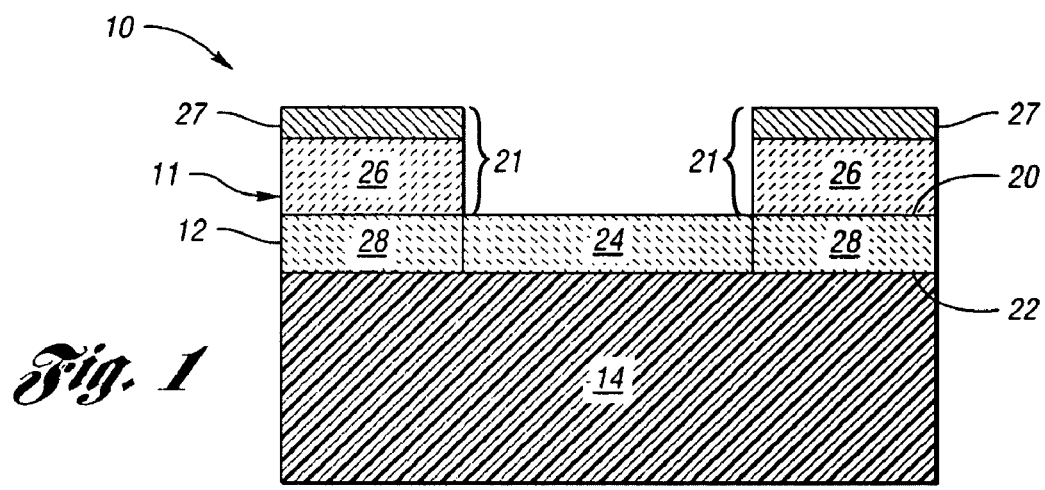
FIG. 1 is a cross-sectional side view of a conceptual image of an insulated thermally conductive laminate prior to irradiation in accordance with one example of the present invention.

An example of the present invention comprises a method of forming gated, self-aligned micro-structures and nano-structures with relatively conical shapes having an apical nano-tip by laser pulse on an area of a thermally conductive laminate having a thermally conductive film. The thermally conductive film is configured to be insulated for two-dimensional heat transfer in the plane of the film. The laminate further comprises a reflective, patterned layer disposed on the film defining an area of irradiation on the film by a light pulse. As a result, a gated, self-aligned nano-structure is formed in essentially one step and can be used in field emission and other applications. The apical nano-tip of the structure has a radius of curvature of less than 50 nanometers. In one example, a substrate is configured to insulate the film for the two-dimensional heat transfer across the film or laterally on the film. The substrate has a low thermal conductivity relative to the film to substantially insulate the thermally conductive film on a surface and provide two-dimensional lateral heat transfer therein.

The thermally conductive film is preferably comprised of a material or materials having a relatively high thermal conductivity. In this example, thermal conductivity is defined as the quantity of heat transmitted, due to unit temperature gradient, in unit time under steady state conditions in a direction normal to a surface of unit area, when the heat transfer is dependant on the temperature gradient. Moreover, thermal conductivity may also be defined as heat flow rate/(distance× temperature gradient). The thermally conductive film may comprise at least one of the following materials: crystalline silicon, germanium, silicon carbide, and gallium arsenide. Preferably, the thermally conductive film is crystalline silicon. However, other suitable thermally conductive materials may be used without falling beyond the scope or spirit of the present invention.

Preferably, the film has a thermal conductivity which is 100 times or more that of the substrate. Preferably, film has thermal conductivity 1.5 W/cm-K and the substrate has one of 0.014 W/cm-K. In this example, the thermally conductive film has a film thickness of between about 10 nanometers (nm) and 3,000 nm. More preferably, the thermally conductive film has a film thickness of between about 100 nm and 1,100 nm.

The thermally conductive film used in this example of the present invention has a characteristic wherein the density in its liquid state is greater than its density in the solid state. As will be described in greater detail below, a nano-structure that can be used in field emission and other applications is formed on the thermally conductive film generally due to the characteristic that greater mass per volume is present in the liquid state of the thermally conductive film than the solid state thereof.

The patterned layer may be comprised of a thin insulating layer disposed on the thermally conductive film and a mask layer disposed on the thin insulating layer. Preferably, the mask layer may be a reflective layer or a conductive layer. In one embodiment, the reflective layer is comprised of a reflective material having a relatively high reflectivity, e.g., between about 50% and 95% reflectivity as will be discussed in greater detail below.

FIG. 1 illustrates a sample 10 including a thermally conductive laminate 11 comprising a thermally conductive film 12 disposed on an insulating substrate 14. As shown, the film 12 includes a first surface 20 and an opposite second surface 22. The first surface has an area 24 for irradiating to melt the area 24. The liquid density of the film 12 is preferably greater than the solid density thereof. The film 12 is preferably disposed on the insulating substrate 14 adjacent the second surface 22 for insulating the film 12. The substrate 14 substantially insulates the thermally conductive film 12 at the second surface 22 to provide for two-dimensional heat transfer in the thermally conductive film. This is accomplished by configuring the substrate 14 to have a low thermal conductivity relative to the thermally conductive film 12. Thus, in this embodiment, the substrate 14 has a thermal conductivity substantially lower than the thermally conductive film 12 to allow for the lateral two-dimensional heat transfer in the thermally conductive film 12.

In one example, the substrate 14 has a thickness of between about one micron and 0.5 millimeters. The substrate 14 may be made of at least one of the following materials: silicon oxide, silicon nitride, silicon oxynitride, glass, and high density polymer. However, it is to be noted that any other suitable material may be used without falling beyond the scope or spirit of the present invention. In this example, the thermally conductive film disposed on the substrate is a silicon-on-insulator (SOI) wafer comprised of 200 nm single crystal silicon bonded to a silica glass substrate.

As shown, the thermally conductive laminate 11 further comprises a patterned layer 21 disposed on the first surface 20 of the thermally conductive film 12. In this embodiment, the patterned layer 21 is comprised of a thin insulating layer 26 and a mask layer 27. As mentioned above, the mask layer may be the reflective layer.

The thin insulating layer 26 may be comprised of the same material as the substrate 14. For example, the thin insulating layer 26 may be made of at least one of the following materials: silicon oxide, silicon nitride, silicon oxynitride, glass, and high density polymer. In this example, each of the reflective layer and the thin insulating layer has a film thickness appropriate to the geometry of the desired device. For a gated field emission tip, the insulating layer would be about the same thickness as the height of the tip, and the reflective layer would be adjusted to provide sufficient reflectivity and absorptivity to shadow the underlying layers from the light pulse.

In this embodiment, the patterned layer 21 has a pattern 25 formed therethrough defining the area 24 on which to irradiate for melting. As will be discussed in greater detail below, the area 24 is exposed and is open for irradiation by a laser pulse. In this example, the mask layer 27 which is made of the reflective material reflects the laser pulse to mask a portion 28 on the film 12 not exposed or open by the pattern 25, thereby preventing irradiation across the portion 28 on the film 12 or laterally on the film 12.

Figure 2:
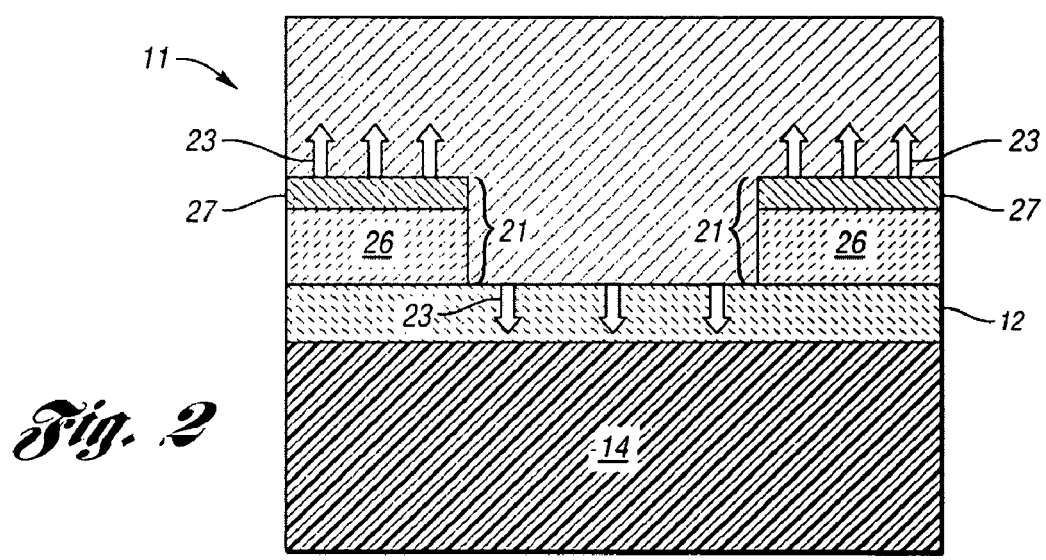
FIG. 2 is a cross-sectional side view of a conceptual image of the thermally conductive laminate in FIG. 1 under irradiation by a laser pulse.

The thermally conductive laminate 11 is preferably placed on a fabrication, XYZ-motion stage for irradiation. In accordance with this example of the present invention, a source of energy 23 is used to emit a laser pulse onto the thermally conductive laminate 11 and onto the area 24 of the first surface 20 of the thermally conductive film 12 as shown in FIG. 2. As further shown, the mask layer 27 masks a portion 28 of the film 12 to reflect the laser pulse from the portion 28, thereby preventing irradiation across or laterally on the portion 28 of the film 12.

An excimer laser system is used in this example. A laser pulse is applied on the thermally conductive laminate 11. In this example, the mask layer 27 reflects the laser pulse 23 from the portion 28 on which the mask layer 27 covers. Via the pattern 25, the mask layer 27 further allows the laser pulse to irradiate the area 24 on the first surface 20 of the thermally conductive film 12 for irradiating to melt the area 24 across or laterally on the film 12. The thin insulating layer 26 Thus, the laminate 11 allows for a one-step gated, self-aligned nano-structure.

The substrate 14 is preferably disposed at the second surface 22 of the thermally conductive film 12 and insulates the second surface 22 thereof. This inhibits heat transfer across the thermally conductive film—substrate boundary. Thus, merely lateral heat transfer in the film is accomplished to melt the irradiated area on the first surface.

In this example, the laser pulse is directed to the laminate 11 and irradiated on the area 24 at a duration of about 30 nano-seconds at a wavelength ($\lambda$) of about 250 nanometers and a fluence of between about 0.1 and 10 J/cm$^2$-ns. In this example, the fluence of the laser pulse is at about 1.5 J/cm$^2$. For example, a spatially homogenized, single pulse of radiation from a KrF excimer laser (e.g., $\lambda$=248 nm, Lambda Physik model LPX 205i) may be applied on the first surface 20 of the thermally conductive laminate 11 by way of a shadow mask or a simple projection system to define the overall irradiated area Thus, a pinhole mask and high resolution objective are no longer needed to produce a defined irradiated spot on the thermally conductive film. The laser processing may be performed in ambient conditions.

In this embodiment, the reflective material comprises Tungsten (W), Molybdenym (Mo), Platinum (Pt), doped silicon (Si), polycrystalline Si, or a mixture thereof. In this embodiment, the reflective material has relatively high normal-incidence reflectivity. For example, at a wavelength ($\lambda$) of an excimer laser of about 248 nanometers and a fluence of between about 0.1 and 10 J/cm$^2$-ns, the reflectivity (R) of W is about 0.51, R of Mo is about 0.63, and R of Pt is about 0.46. If longer wavelength lasers are used for the processing, e.g., a high-power Nd:YAG laser emitting a wavelength $\lambda$ at about 1064 nm, then the reflective material has an R of about 0.90 in the visible and near-infrared spectral range.

The reflective material may also include dielectric multi-layers to effectively reflect light. Such dielectric multilayers may be termed high-reflector (HR) coatings. Each of such HR coatings comprise stacks of alternating high-refractive index and low-refractive index coating with thickness, wherein each coating has an optical thickness (i.e. thickness times refractive index) equal to $\lambda$/4. For example, at $\lambda$=248 nm, the HR coating of a multilayer system of SiO$_2$ (silicon dioxide) has a refractive index n of about 1.5 and HfO$_2$ (hafnium oxide) has a refractive index of about 2. Moreover, a stack of three periods on a Si substrate would result in a reflectivity R of about 0.6 with Si refractive index n of about 3.5.

In another embodiment, the conductive layer may be comprised of a conductive material having a thermal conductivity of about 1.5 W/cm-K. In this example, the conductive material is comprised of metal or metal alloy, e.g., Tungsten (W), Molybdenym (Mo), Platinum (Pt), doped silicon (Si), polycrystalline Si, or a mixture thereof. Alternatively, the conductive material may be a metal or metal alloy coated with an HR coating.

As shown in FIG. 2, as the irradiated area 24 melts as the portion 28 avoids irradiation, the density of the irradiated area 24 increases due to the characteristic of the thermally conductive film 12, i.e., the density of the thermally conductive film 12 is greater in its liquid state than the density in its solid state. The area 24 has a heat diffusion length during the irradiation time of between about 1 micron and 3 microns, and preferably between about 1.5 micron and 2 microns. In this example, the pattern 25 is of a circular shape defining the irradiated area 24. As such, a round and relatively flat circular depression is formed having the diameter which generally corresponds to the size of the laser spot/pulse. In this example, the depression is about 40 nm below the first surface 20.

Figure 3:
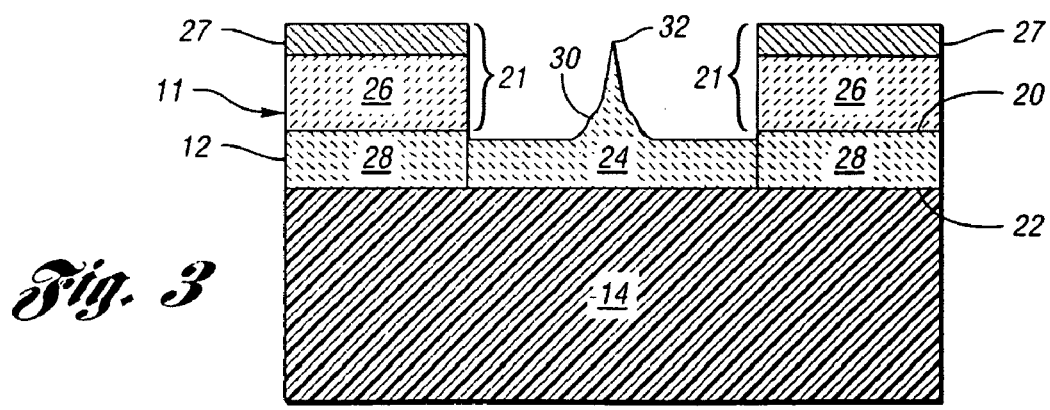
FIG. 3 is a cross-sectional side view of a conceptual image of the thermally conductive laminate having a gated, self-aligned nano-structure formed thereon after irradiation.

After irradiating the area 24 to melt the area 24 across the thermally conductive film in a two-dimensional heat transfer fashion thereacross, the area 24 rapidly self-cools at room temperature to solidify the melted area. As shown in FIG. 3, from its periphery, the area 24 in liquid state cools inwardly to form a nano-structure 30 having an apical nano-tip 32. In this example, the nano-structure 30 is a nano-cone. However, as will be discussed below, the nano-structure may take on other structural shapes, e.g., a nano-ridge, without falling beyond the scope or spirit of the present invention. In this example, the apical nano-tip has a radius of curvature of less than 50 nm and has a base having a diameter of about 1.5 micron and a height of about 1 micron. Sample surface topography may be examined by contact-mode atomic force microscopy (AFM) on a Park Autoprobe LS AFM system using Contact Ultra-lever® tips.

Figure 4:
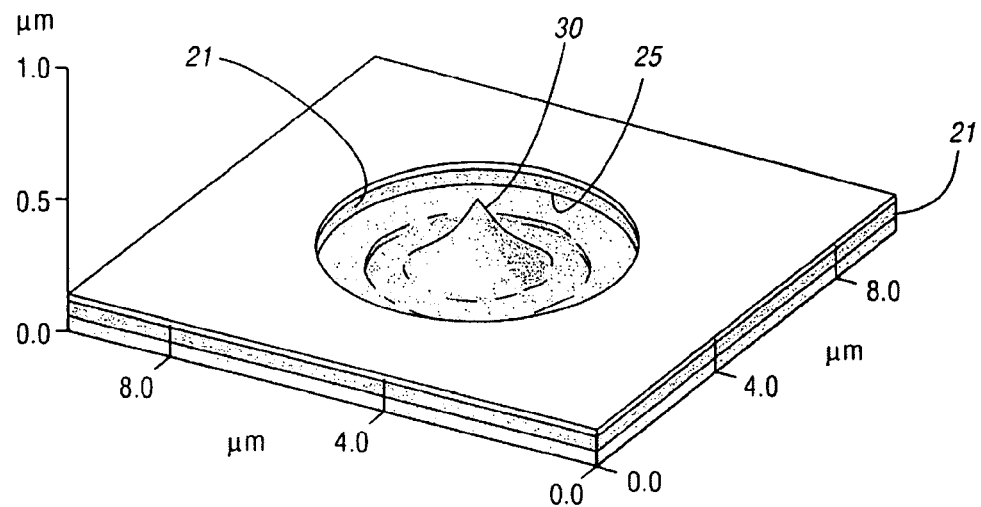
FIG. 4 is a conceptual view of an atomic force microscopy (AFM) image of a gated, self-aligned nano-structure fabricated in accordance with one example of the present invention.

FIG. 4 illustrates a conceptual AFM image of a gated nano-tip fabricated by a single pulse. The single pulse may have a fluence of about 1.5 J/cm$^2$. As shown, the cone is centered in the flat circular depression which corresponds to the size of the pattern 25 of the patterned layer 21. The depression in this case may be about 1 micron below the original reflective surface. The nano-cone may have a generally conical shape with a base of diameter of about 1.5 μm and height of about 1 μm from the depression. The apparent radius of curvature of the tip apex may be about 50 nm or less.

Figure 5:
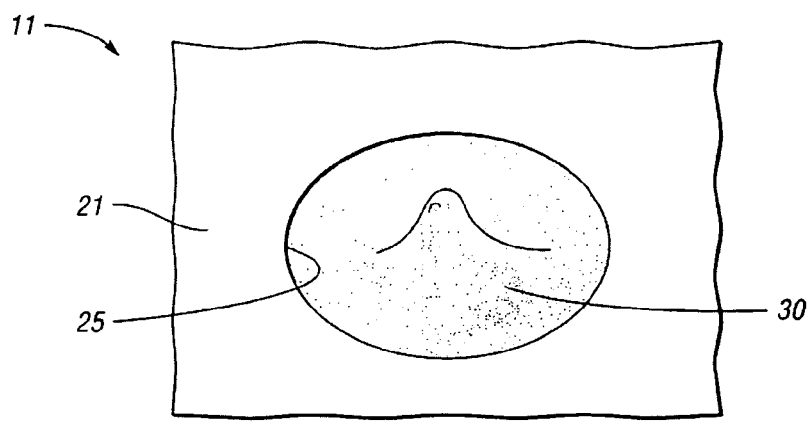
FIG. 5 is an illustration of a conceptual scanning electron microscopy (SEM) image of a gated, self-aligned nano-structure fabricated by a laser pulse in accordance with one example of the present invention.

FIG. 5 depicts a conceptual scanning electron microscopy (SEM) image. The SEM image may be taken from any suitable system. For example, the SEM image may be taken from a JEOL JSM 6300F electron microscope at an accelerating voltage of 5 KeV and a sample tilt of 60 deg relative to the electron beam.

It has been found that the thermally conductive film and the interplay of material properties of the film and the substrate contribute to the formation of the nano-structure. Although not wanting to be limited to theory, it is believed that limiting the dissipation of heat from the laser-heated spot to predominantly lateral or two-dimensional (2D) transfer within the film is a contributing factor. In this example, such a 2D heat transfer pattern results from the considerably lower thermal conductivity of the silica substrate (0.014 W/cm-K) compared to that of silicon (1.5 W/cm-K). Another contributing factor is that Si has higher density ($\rho$=2.52 g/cm$^3$) in its liquid state than in its solid state ($\rho$=2.32 g/cm$^3$ for crystalline Si and $\rho$=2.2 g/cm$^3$ for amorphous Si).

Under the conditions of irradiation, the silicon under the irradiated spot is melted and then it rapidly self-cools and solidifies. It is believed that the dynamics and the geometry of the solidification process, contributes to the formation of the nano-structure. Due to the lateral heat dissipation, the edges of the area or spot are more rapidly cooled and have lower temperature than its central region. Thus, the solidifying or freezing front moves from the edges to the center and pushes the remaining liquid silicon toward the center. This solidification process of fast displacement of liquid silicon toward the center is enhanced by the fact that the solidified material occupies larger volume. In this example, it results in the formation of a jet or cone, that upon complete solidification forms a nano-structure having nano-tips.

Figure 6:
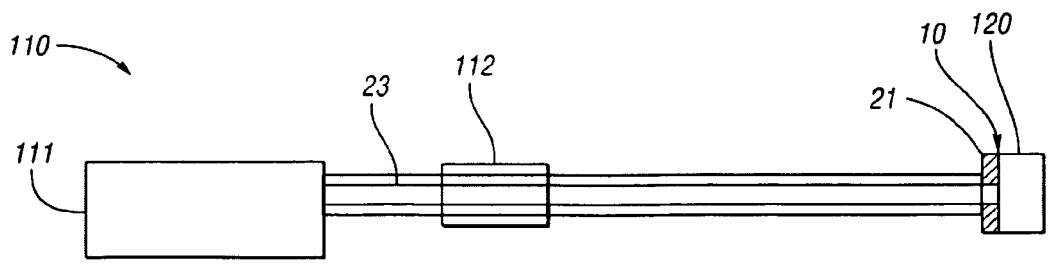
FIG. 6 is a schematic representation of a fabrication system for forming gated, self-aligned nano-structures in accordance with one example of the present invention.

FIG. 6 depicts a computer controlled and operated system 110 for forming a gated, self-aligned nano-structure for electron extraction in accordance with one example of the present invention. The system 110 may be controlled and operated by any suitable computer or central processing unit (cpu). As shown, the system 110 includes an energy source such as a laser 111 to emit a laser beam/pulse 23. In this example, the energy source is a KrF excimer laser. An excimer laser is a form of ultraviolet chemical laser which can be used in lithography or micromachining. The term excimer is short for excited dimer (a molecule composed of 2 subunits linked together), and refers to the chemical gain medium of the laser. The gain medium is defined as a determining factor of the wavelength of operation of the laser.

System 110 shown in FIG. 6 further includes an optical beam homogenizer 112 which is configured to redistribute the energy into a substantially uniform beam. A beam homogenizer typically breaks up the laser beam into sections and recombines them in a pattern that increases the overall fluence over a cross-section defining a homogenized beam. In this example, the homogenizer includes two, crossed 5×10 arrays of cylindrical lenses and serves to shape the laser beam to a 17×17 millimeter uniform-intensity. The term "uniform-intensity" may be defined as a uniformity better than 90%.

The homogenized beam 111 is then directed to the thermally conductive laminate 11 as shown. As the beam 111 contacts the patterned layer 21, the area 24 which is defined by the pattern 25 (see FIGS. 1-3) receives the beam 111.

The system further includes an XYZ$\theta$ motion stage 120 on which the sample is placed for irradiation. In one example, the stage 120 is a combination of Newport PM500-33LR XYO stage and PM500 1V vertical motorized, computer-controlled stages. The stage serves to properly position the sample in the XY plane and insure proper focusing (positioning in the Z direction).

In this example, the wavelength of the laser radiation is between about 50 nm and 10 microns. The pulse duration is between about 0.1 ns and 1,000 ns. It is to be understood that the laser pulse may be derived from other systems and light sources including ultraviolet, visible, and infrared, without falling beyond the scope or spirit of the present invention.

Figure 7A:
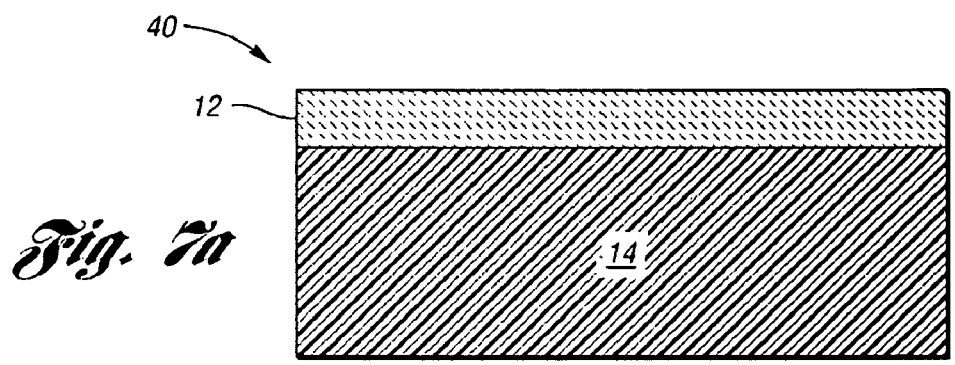
FIG. 7a-7e are cross-sectional side views conceptual images of materials in making the thermally conductive laminate in accordance with one example of the present invention.
Figure 7B:
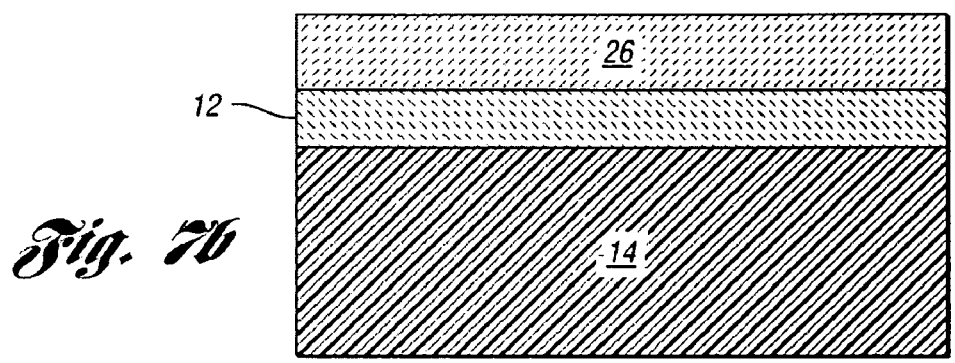
Figure 7C:
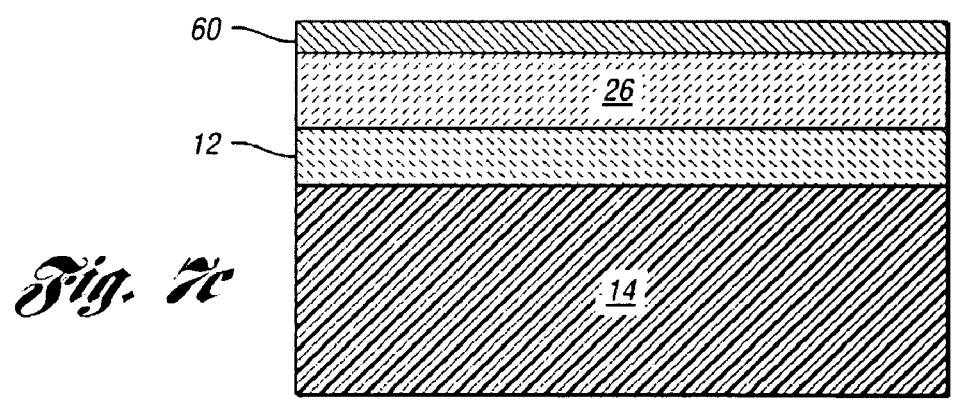

In another example, a method of making a thermally conductive laminate for forming a gated, self-aligned micro-structure or nano-structure is provided. The method comprises providing a starting material 40 comprising the thermally conductive film 12 and the insulating substrate 14 bonded to the second surface 22 of the film 12 as shown in FIG. 7a. As shown in FIG. 7b, the method then comprises disposing the thin insulating layer 26 on the first surface 20 of the film 12 by any suitable chemical deposition technique, preferably by plasma enhanced chemical vapor deposition (PECVD). As shown in FIG. 7c, the method further comprises disposing a cover layer 60 comprised of the reflective material (preferably metal) on the thin insulating layer 26 by any suitable deposition technique, preferably by a sputtering process.

Figure 7D:
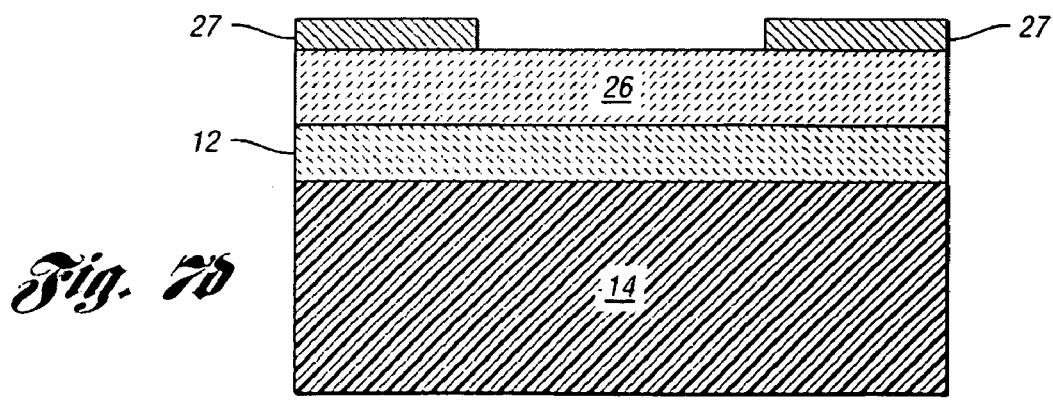
Figure 7E:
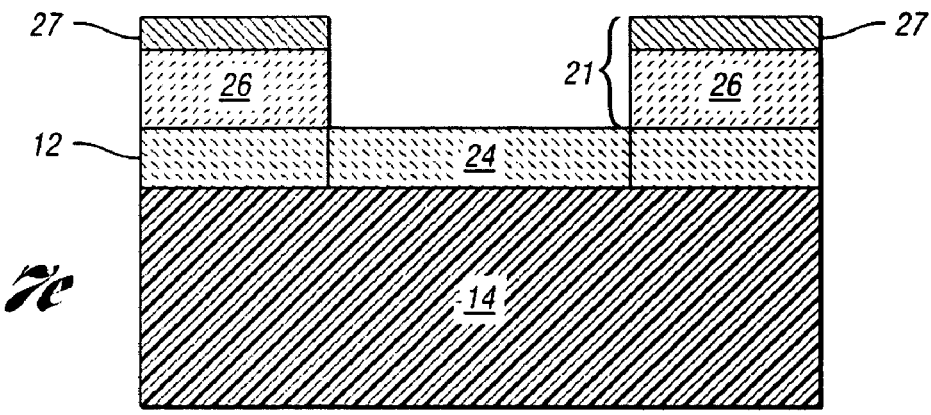

The method of making the thermally conductive laminate further comprises patterning the cover layer 60 with a predetermined shape (e.g. circular shape having a diameter of about 5 μm) as shown in FIGS. 7d and 7e defining the patterned layer 21. This may be accomplished by any suitable manner, preferably by lithography and etching. As shown in FIG. 7e, the method further includes etching the thin insulating layer 26 having the pattern 26 to define the area 24 on which irradiation occurs when a laser pulse is directed thereon. This may be accomplished by reactive ion etching or wet hydrofluoric acid (HF) etching using an etch mask. The resulting sample defines the thermally conductive laminate 11.

Figure 7F:
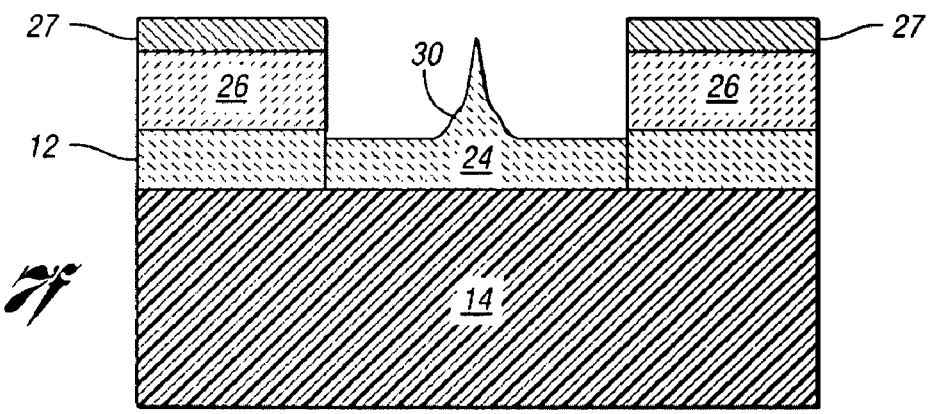
FIG. 7f is a cross-sectional side view of a conceptual image of a gated, self-aligned nano-structure made from the laminate shown in FIG. 7e.

In forming the gated, self-aligned micro-structure or nano-structure, a single pulse excimer laser is applied to the laminate 11 as shown in FIG. 7f. The pulse is received on the area 24 and is allowed to cool which results in the formation of a gated, self-aligned nano-tip 30 as discussed above.

EXAMPLE 1

This example provides a method of forming a gated, self-aligned nano-structure having a nano-tip for enhanced electron extraction. In this example, spatially homogenized, single pulses of radiation from a KrF excimer laser ($\lambda$=248 nm, Lambda Physik, model LPX 205) are applied on the patterned layer of the thermally conductive laminate to form uniformly illuminated circular spots on the first surface of the thermally conductive film. This is accomplished via a projection system with a demagnification factor of 8.9 and a resolution limit of 2 micrometers. Irradiation is performed on commercially acquired silicon-on-insulator (SOI) wafers comprising 200 nm single-crystal silicon (Si) film having a first surface and a second surface. The patterned layer is bonded to the first surface thereof and a silica glass substrate is bonded to the second surface of the film. The patterned layer has a pattern formed therethrough defining the area on which to irradiate for melting.

In addition, SOI wafers that are comprised of a single-crystal Si layer on 1 μm layer of silica on a bulk Si substrate (SOIS) are used. The samples are plasma-etch-thinned to different thicknesses of the Si layer in the range of between about 0.8 and 4.1 μm. The laser processing are performed in ambient, clean-room conditions, and the sample surface topography is then examined by contact-mode atomic force microscopy (AFM) on a Park Autoprobe LS AFM system using Contact Ultralever® tips. Some samples are coated with a thin layer of Au and then imaged by scanning electron microscopy (SEM) on a JEOL JSM 6300F electron microscope at an accelerating voltage of 5 KeV and a sample tilt of 60 deg relative to the electron beam. The samples are allowed to self-cool and solidify at room temperature to form nano-structures having nano-tips that can be used in field emission and other applications.

EXAMPLE 2

This example provides a method of forming a plurality of gated, self-aligned nano-structures 30 on a thermally conductive laminate 111 having a mask layer 127 with a plurality of patterns formed therethrough. Each of the nano-structures 130 has a nano-tip 132 that can be used in field emission and other applications. In this example, a 1.5 J/cm$^2$ single pulse is irradiated on the laminate with the sample-supporting XYZ stage. The laminate 111 was allowed to self-cool and solidify.

Figure 8:
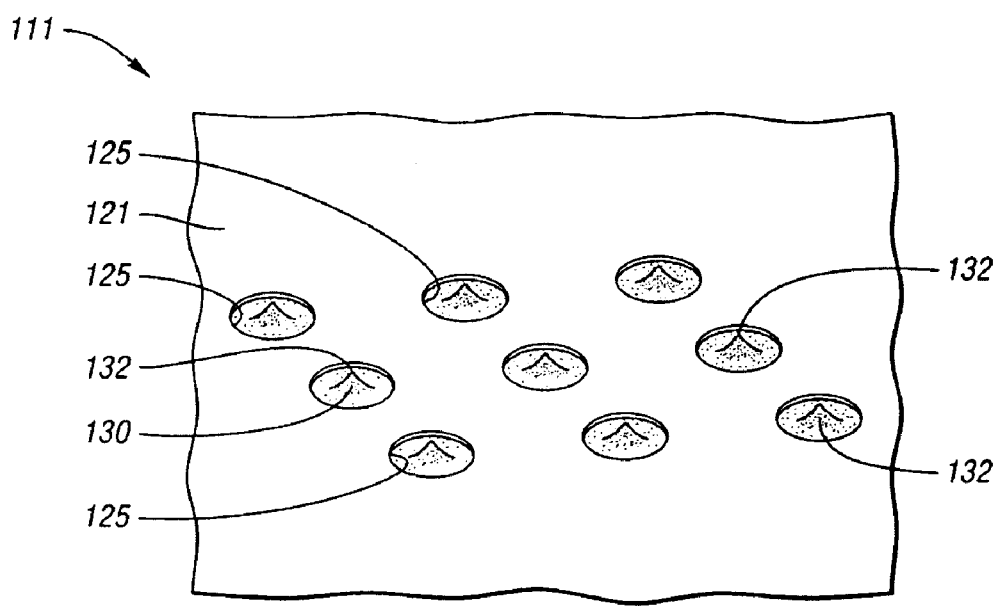
FIG. 8 is an illustration of a conceptual SEM image of an array of nano-structures fabricated consecutively by single laser pulses in accordance with another example of the present invention.

FIG. 8 shows a 3×3 array of nano-structures 130 that would be fabricated by the single pulse applied to the laminate. As depicted in FIG. 8, this example also illustrates the reproducibility of the fabrication process and the potential for obtaining relatively dense arrays of plurality of such nano-structures by using, for example, the patterned layer having a plurality of patterns formed therethrough.

While various embodiments for carrying out the invention have been described in detail, those familiar with the art to which this invention relates will recognize various alternative designs and embodiments for practicing the invention as defined by the following claims.

The invention claim is:

1. A method of forming a self-aligned nano-structure, the method comprising:
    irradiating a first surface of a thermally conductive laminate to melt an area across the first surface of the laminate, the laminate comprising a thermally conductive film and a patterned layer disposed on the first surface of the film, the patterned layer having a pattern formed therethrough defining the area for melting, the film being insulated at a second surface thereof to provide two-dimensional heat transfer across the film, the liquid density of the film being greater than the solid density thereof; and
    cooling the area inwardly from the periphery thereof to form the nano-structure having an apical nano-tip.

2. The method of claim 1 wherein the thermally conductive film comprises at least one of the following materials: crystalline silicon, germanium, silicon carbide, and gallium arsenide.

3. The method of claim 1 wherein the thermally conductive film has a film thickness of between about 10 nano meters (nm) and 3,000 nm.

4. The method of claim 1 wherein the thermally conductive film has a film thickness of between about 100 nm and 1,100 nm.

5. The method of claim 1 wherein the area has a diameter of between about 5 and 10 microns.

6. The method of claim 1 wherein the area has a width of between about 5 and 10 microns.

7. The method of claim 1 wherein the area has a heat diffusion length during the irradiation time of between about 1 and 3 microns.

8. The method of claim 1 wherein the film is disposed on an insulating substrate adjacent the second surface for insulating the film to provide for two-dimensional heat transfer across the film, the substrate having a low thermal conductivity relative to the film.

9. The method of claim 8 wherein the substrate has a thickness of between about 1 micron and 0.5 millimeters.

10. The method of claim 8 wherein the substrate is made of at least one of the following materials: silicon oxide, silicon nitride, silicon oxynitride, glass, and high density polymer.

11. The method of claim 8 wherein the film has a thermal conductivity of about 1.5 W/cm-K and the substrate has a thermal conductivity less than the thermal conductivity of the film.

12. The method of claim 1 wherein the nano-structure includes at least one of the following structures: nano-cone and nano-ridge.

13. The method of claim 1 wherein the apical nano-tip has a radius of curvature of between about 10 nm and 100 nm.

14. The method of claim 1 wherein the nano-structure includes a base having a diameter of about 1.5 micron and a height of about 1 micron.

15. The method of claim 14 wherein the area includes a depression of about 40 nm defining the periphery of the area, the base of the nano-structure extending therefrom.

16. The method of claim 1 wherein the step of irradiating includes:
    emitting a single energy pulse;
    homogenizing the pulse to shape the laser pulse to deliver a predetermined intensity;
    receiving the pulse through the patterned layer to define the area across the first surface of the thermally conductive laminate to be irradiated; and
    melting the area of the laminate.

17. The method of claim 16 wherein the pulse is emitted for about 30 nano-seconds at a wave length of about 250 nm and a fluence at between about 0.1 and 10 J/cm$^2$.

18. The method of claim 16 wherein the energy pulse is from one of the following sources: ultraviolet, visible, or infrared: either laser or non-laser light.

19. The method of claim 18 wherein the wavelength of the pulse is between about 50 nm and 10 microns.

20. The method of claim 19 wherein the pulse duration is between about 0.1 ns and 1,000 ns.

21. The method of claim 1 wherein the step of cooling includes solidifying the area to form the nano-structure for electron extraction.

22. The method of claim 1 wherein the patterned layer comprises a plurality of patterns formed therethrough defining a plurality of areas respectively for melting.

23. The method of claim 1 wherein the patterned layer comprises a thin insulating layer disposed on the first surface of the film, the patterned layer further comprising a mask layer disposed on the thin insulating layer, the thin insulating layer and the mask layer having the pattern formed therethrough to allow a laser pulse to irradiate the area on the thermally conductive film.

24. The method of claim 1 wherein the liquid density of the film is greater than the solid density of the film.

25. A method making a thermally conductive laminate for forming a gated, self-aligned micro-structure or nano-structure, the method comprising:
    providing a starting material comprising a thermally conductive film having a first surface and a second surface, the starting material further comprises an insulating substrate disposed on the second surface;
    disposing a cover layer on the first surface of the thermally conductive film, the cover layer comprising a reflective material; and
    forming a pattern through the cover layer to define a patterned layer having a periphery on the thermally conductive film that defines an area on which irradiation occurs when a laser pulse is directed thereon.

26. The method of claim 25 wherein disposing the cover layer comprises disposing a thin insulating layer on the first surface of the thermally conductive film and disposing the cover layer on the insulating layer.

27. The method of claim 26 wherein forming the pattern through the cover layer comprises:
    forming the pattern through the cover layer to define the patterned layer; and
    etching the thin insulating layer to form the pattern therethrough, the pattern on the thin insulating layer having a periphery on the thermally conductive film that defines an area on which irradiation occurs when a laser pulse is directed thereon.

* * * * *